(12) United States Patent
Mese et al.

(10) Patent No.: US 10,861,451 B2
(45) Date of Patent: Dec. 8, 2020

(54) MODIFICATION OF USER COMMAND

(71) Applicant: Lenovo (Singapore) Pte. Ltd., Singapore (SG)

(72) Inventors: John Carl Mese, Cary, NC (US); Nathan J. Peterson, Oxford, NC (US); Russell Speight VanBlon, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 127 days.

(21) Appl. No.: 15/928,779

(22) Filed: Mar. 22, 2018

(65) Prior Publication Data
US 2019/0295538 A1 Sep. 26, 2019

(51) Int. Cl.
*G10L 21/00* (2013.01)
*G10L 15/22* (2006.01)

(52) U.S. Cl.
CPC ........ *G10L 15/22* (2013.01); *G10L 2015/223* (2013.01)

(58) Field of Classification Search
CPC ...................................................... G10L 21/00
USPC ... 704/275, 235, 232, 234, 2, 260, 277, 500; 715/779; 725/39
See application file for complete search history.

(56) References Cited

U.S. PATENT DOCUMENTS

| | | | | |
|---|---|---|---|---|
| 9,502,031 B2* | 11/2016 | Paulik | ..................... | G10L 15/22 |
| 9,740,751 B1* | 8/2017 | Yeom | ................. | G10L 15/1822 |
| 10,229,687 B2* | 3/2019 | Jeong | ....................... | G06F 40/35 |
| 10,332,518 B2* | 6/2019 | Garg | ................... | G06F 21/6245 |
| 2010/0299147 A1* | 11/2010 | Stallard | ................... | G10L 13/00 704/235 |
| 2011/0060587 A1* | 3/2011 | Phillips | .................... | G10L 15/30 704/235 |
| 2014/0201672 A1* | 7/2014 | Borzello | .............. | G06F 3/0482 715/779 |
| 2015/0256873 A1* | 9/2015 | Klein | ................. | H04N 21/4383 725/39 |
| 2017/0186430 A1* | 6/2017 | Sharifi | .................... | G10L 15/265 |
| 2017/0200455 A1* | 7/2017 | Aggarwal | .............. | G10L 13/00 |
| 2018/0314343 A1* | 11/2018 | Montaldi | .............. | G06F 40/274 |

* cited by examiner

*Primary Examiner* — Michael Colucci
(74) *Attorney, Agent, or Firm* — Ference & Associates LLC

(57) ABSTRACT

One embodiment provides a method, including: receiving, at an information handling device, an audible command to perform a function; determining, using a processor, at least one aspect associated with the audible command that prevents performance of the function; and providing, based on the determining, a suggested modification to the audible command. Other aspects are described and claimed.

18 Claims, 3 Drawing Sheets

MODIFICATION OF USER COMMAND

BACKGROUND

Information handling devices ("devices"), for example smart phones, tablet devices, smart speakers, home automation devices (e.g., smart thermostats, smart lights, other smart appliances, etc.), laptop and personal computers, and the like, may be capable of performing functions responsive to receiving user commands. A user may provide a command, for example, by interacting with a voice input module on the device through use of natural language. This style of interface allows a device to receive voice inputs from a user (e.g., queries, commands, etc.), process those inputs, and perform one or more corresponding functions.

BRIEF SUMMARY

In summary, one aspect provides a method, comprising: receiving, at an information handling device, an audible command to perform a function; determining, using a processor, at least one aspect associated with the audible command that prevents performance of the function; and providing, based on the determining, a suggested modification to the audible command.

Another aspect provides an information handling device, comprising: a processor; a memory device that stores instructions executable by the processor to: receive an audible command to perform a function; determine at least one aspect associated with the audible command that prevents performance of the function; and provide, based on the determining, a suggested modification of the audible command.

A further aspect provides a product, comprising: a storage device that stores code, the code being executable by a processor and comprising: code that receives an audible command to perform a function; code that determines at least one aspect associated with the audible command that prevents performance of the function; and code that provides, based on the determining, a suggested modification to the audible command.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
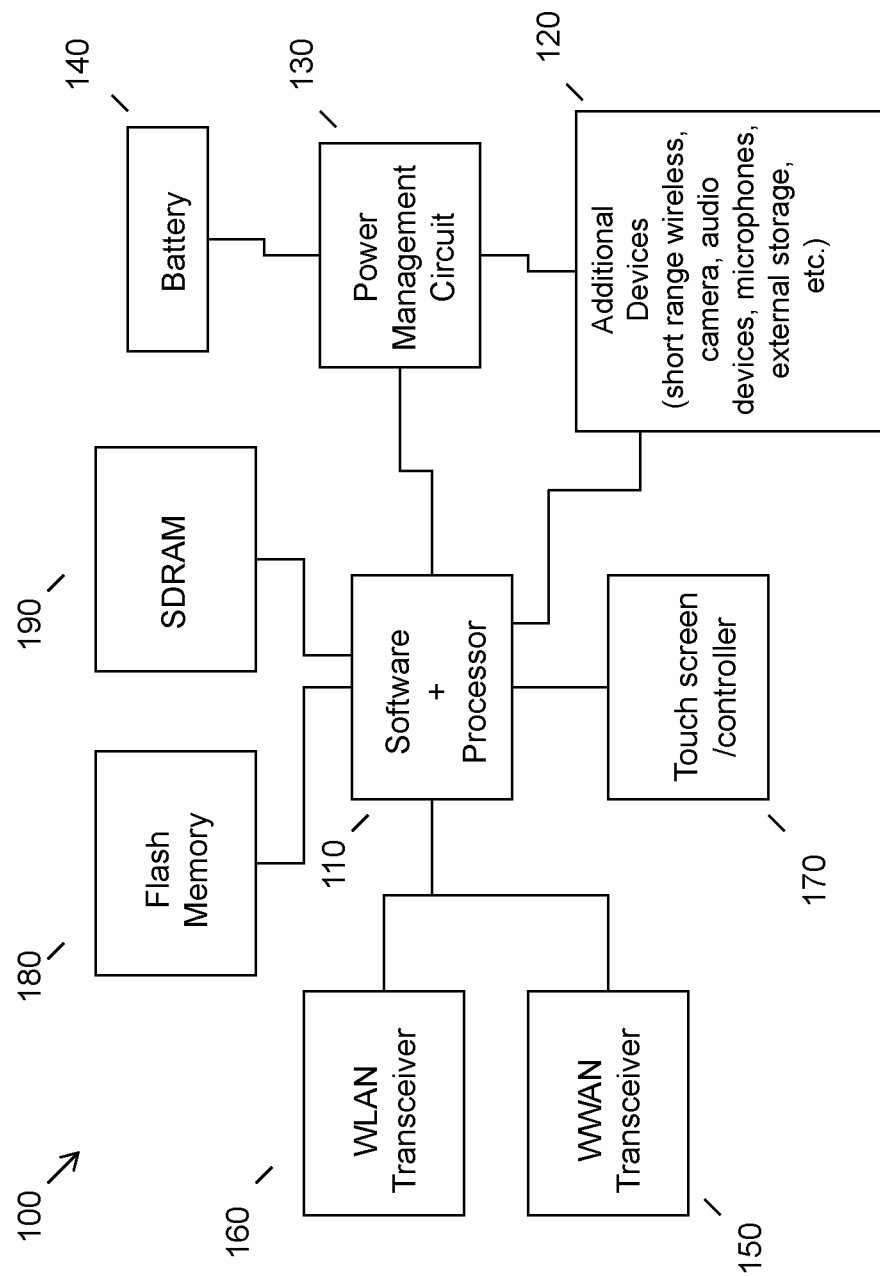
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

It can be frustrating to a user when a voice command fails to properly register with a device. The failure of the command to produce a user-intended function may be a result of one or more aspects of the audible command such as a low input volume (e.g., the audible command did not reach the device at an optimal volume level or clarity, etc.), an improper command structure (e.g., where the audible command was of a form not familiar to the device, etc.), ambiguity in the command (e.g., where a function may be performed on more than one object, etc.), and the like. Furthermore, additional frustration may result when the user is unable to identify the reason why the voice command failed to execute and/or why the user-intended function was not performed. Without knowing the cause of the issue, a user is unable to take corrective action when reissuing the command.

An existing solution may require a user to ask another individual how to correctly issue the command. For example, a user may be visiting another individual (e.g., in their home, etc.) and ask them how to properly interact with a particular device. In another example, a user may be in a public forum and may need to ask a stranger how to correctly provide commands to a device. However, a user may not want to burden another individual with a question and/or may find it embarrassing or uncomfortable to ask another individual, especially a stranger, how to operate a device. Additionally, in many situations another individual is not present to provide assistance to the user. Another solution may allow a user to follow the instructions present in a guide (e.g., an instructional booklet, an instructional video, a weekly newsletter, etc.) to learn how to interact with a device. However, this solution may be time-consuming and/or burdensome and may cause issues when a user needs to provide a command in a timely fashion (e.g., when interacting with a public terminal, etc.). Additionally, a user may be following the instructions provided by the guide but still find that their command does not produce an intended result, which may cause additional frustration. As such, no known solutions currently exist that provide an explanation regarding why a user command does not result in an intended function and/or provide a suggestion on how a user may modify the command to perform the intended function.

Accordingly, an embodiment provides a method for providing a suggestion to modify an aspect of a user command in order for a device or system to perform a user-intended function corresponding to the user command. In an embodiment, an audible command may be received that requests a device to perform a function (e.g., obtain query results, play media, adjust an appliance setting, etc.). An embodiment may then determine an aspect of the command that prevents performance of the function and thereafter provide a suggested modification to the audible command. The suggested modification may be incorporated by the user in a subsequent issuance of the audible command. Such a method may enable a user to be apprised of a correct method or providing command inputs to a device.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
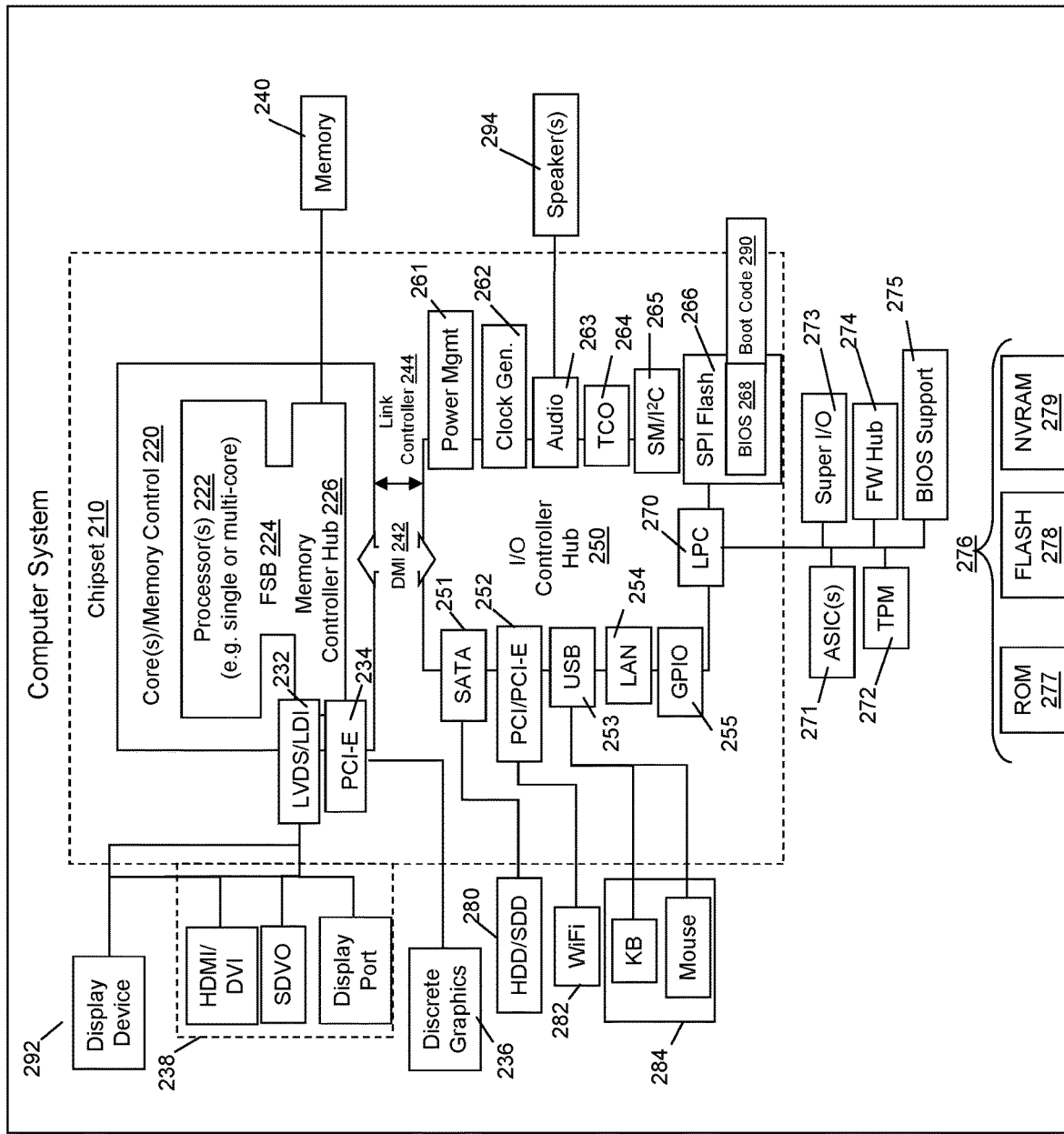
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart speakers, smart appliances, personal computer devices generally, and/or electronic devices which may include digital assistants that a user may interact with and that may perform various functions responsive to receiving user command inputs. For example, the circuitry outlined in FIG. 1 may be implemented in a tablet or smart phone embodiment, whereas the circuitry outlined in FIG. 2 may be implemented in a personal computer embodiment.

Figure 3:
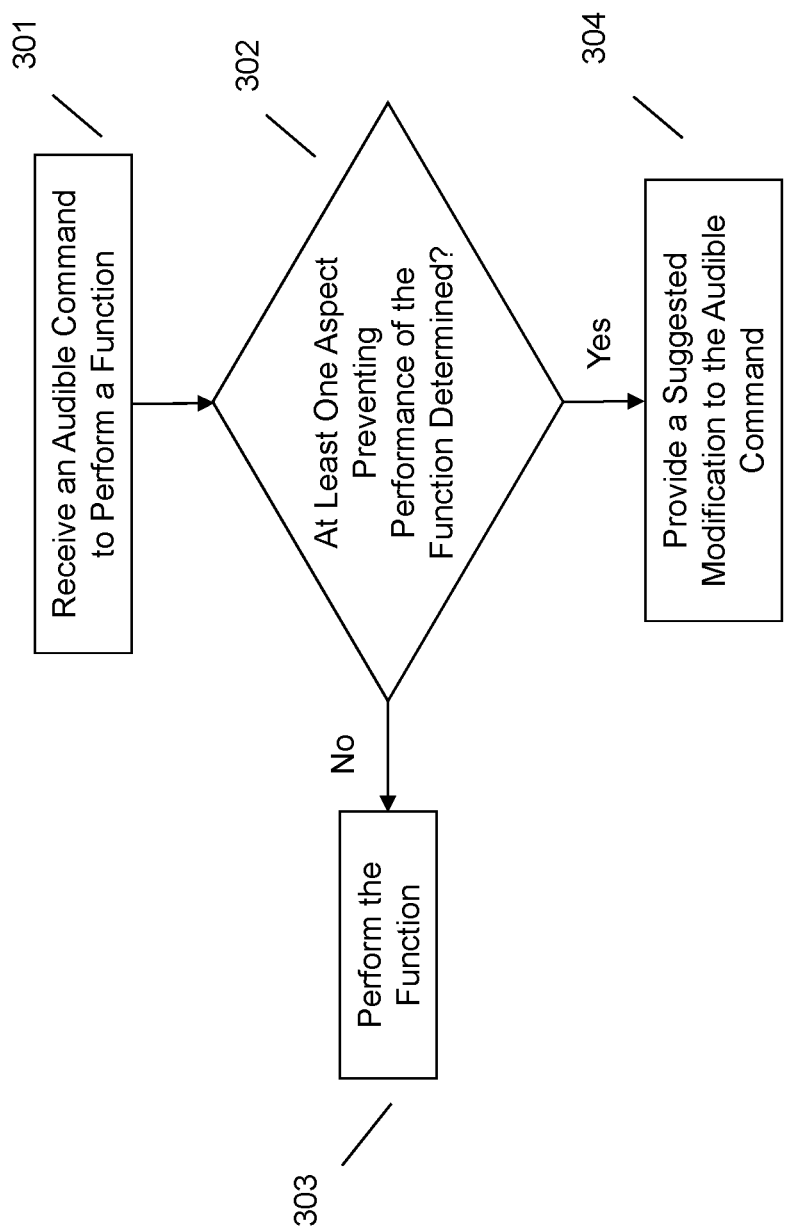
FIG. 3 illustrates an example method of providing a suggested modification to an originally provided audible command.

Referring now to FIG. 3, an embodiment may suggest a modification to a previously provided audible command in order to increase the likelihood that a user-intended function corresponding to the audible command is performed. At 301, an embodiment may receive a user command at a device. In an embodiment, the user command may be virtually any command such as an audible command, a gesture command, a keyboard command, a mouse-click command, and the like. For simplicity purposes, the majority of the discussion herein will involve an audible command, however, it should be understood that this is not limiting and other user command types may be used.

In an embodiment, the audible command may be virtually any command that demands performance of a function. The function may be virtually any function capable of being executed by the device, another device in communication with the device, a system the device is connected to, and the like. For example, the function may be the playing of a song, the adjustment of a volume setting, the adjustment of light levels in a room, etc.

In an embodiment, the audible command may be received/detected by an input device (e.g., a microphone, an audio capture device, etc.) operatively coupled to or in communication with the user device. In an embodiment, the input device may be an input device integral to the user device. For example, a smart phone may be disposed with a microphone capable of receiving voice input data. Alternatively, the input device may be disposed on another device and may transmit received voice input data to the user device. For example, voice input may be received at a smart speaker that may subsequently transmit the voice data to another device (e.g., to a user's smartphone for processing, etc.). Voice input data may be communicated from other sources to the user device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the input device may be configured to continuously receive voice input data by maintaining the input device in an active state. The input device may, for example, continuously detect voice input data even when other sensors (e.g., cameras, light sensors, speakers, other microphones, etc.) associated with the user device are inactive. Alternatively, the input device may remain in an active state for a predetermined amount of time (e.g., 30 minutes, 1 hour, 2 hours, etc.). Subsequent to not receiving any voice input data during this predetermined time window, an embodiment may switch the input device to a power off state. The predetermined time window may be preconfigured by a manufacturer or, alternatively, may be configured and set by one or more users.

At 302, an embodiment may determine an aspect associated with the audible command that prevents performance of the user-intended function. In an embodiment, the aspect may correspond to a volume level of the received audible command. For example, a user may provide the audible command at an audible level that is too low for an embodiment to clearly register the command (e.g., because the user is speaking too softly, because the user is too far away from the device, etc.). An embodiment may identify an audible input level of a received command input and, responsive to identifying that the audible input level of the received input is less than a predetermined threshold, an embodiment may determine that the volume level of the command is too low.

In an embodiment, the aspect may correspond to an input rate of the received audible command. For example, a user may provide the audible command at an abnormal input rate (e.g., too fast, too slow, etc.) that may affect device comprehension of the words in the command. An embodiment may utilize one or more speech analysis techniques to determine whether words in a command are being received at a rate outside of a threshold rate range. Responsive to determining that an input rate of a command is outside of the threshold range, an embodiment may determine that the input rate is sub-optimal.

In an embodiment, the aspect may correspond to a format of the audible command. For example, a user may request a device to play a specific song. The device may require that such a command be provided in a specific format, for example, that the artist's name be provided first followed by the song title. An embodiment may identify that at least one part of the command is associated with an improper format (e.g., that a portion of the command is improperly provided before or after another portion, that a portion of the command is missing, etc.) and thereafter determine, based on this identification, that the command is improperly formatted.

In an embodiment, the aspect may be associated with an ambiguity in the audible command. A user may, for instance, command the device to perform a function on an object. However, there may be a plurality of objects and the device may not know which object the user intended the function to be performed on. For example, a user may provide the command "dim the lights" but a device or system may not know whether to dim all of the lights, dim some of the lights, which room to dim the lights in, by what factor should the lights be dimmed, etc. An embodiment may therefore determine that a command is ambiguous by identifying two or more possible objects on which a function may be performed on or may that perform a function.

In an embodiment, after receiving the audible command, an embodiment may perform a function that is different than the user-intended function. An embodiment may then receive user feedback input that may indicate that the performed function is not the user-intended function. An embodiment may utilize the user-feedback input in the determination step. For example, a user may provide volume reduction input (e.g., by saying "volume down", etc.) to a device. A device may thereafter register this input and correspondingly decrease the volume of active media (e.g., a currently playing song, etc.) by a predetermined factor. A user unsatisfied with the resulting volume may provide the user-feedback input "no" or "it's still too loud" or even simply repeat the original command. In a similar example, an embodiment that dims the wrong set of lights may receive the user-feedback input "no" or "wrong lights". By identifying the specific user-feedback input with respect to the context of the original command, an embodiment may be able to determine that a specificity of the original audible command is lacking to achieve a user-intended function.

Responsive to determining, at 302, that a user-intended function corresponding to an audible command will be performed, an embodiment may, at 303, perform the function. Conversely, responsive to determining, at 302, that at least one aspect of the audible command prevents performance of the function, an embodiment may provide, at 304, a suggested modification to the audible command.

In the context of this application, a suggested modification output may be a suggestion provided to a user regarding how to modify their original audible command when providing the command again so that an intended function corresponding to the command is performed. In an embodiment, the suggested modification output may be an audible output, visual output, a combination thereof, and the like provided using one or more output devices (e.g., a speaker, a display screen, etc.) integrally or operatively coupled to the user device.

In an embodiment, the suggested modification output may comprise a description of the aspect of the audible command that may be preventing the user-intended function from being performed. For example, responsive to identifying that an audible input level of the audible command is too low, an embodiment may indicate that fact to the user. Additionally or alternatively, an embodiment may suggest how to adjust a subsequently provided audible command. Using the previous example, an embodiment may suggest the user to increase the volume of their audible command.

In another embodiment, for an audible command determined to lack specificity, an embodiment may suggest a modification to the command that tailors the command to produce a more user-specific function. For example, for a user wanting to decrease the volume level of audible media by a specific amount, an embodiment may suggest an alternative command than just "volume down". For instance, an embodiment may suggest the user specify a final volume level they want the volume set at, where the volume level is a number between 1 and 10 (e.g., "decrease the volume to level 4", "set volume 4", etc.). In another example, a user attempting to request the device to play a song may have originally provided an audible command comprising only the song's title where both the artist and the song title may be required for execution of the command. An embodiment may thereafter suggest the user to provide the artist's name first followed by the song title.

In an embodiment, responsive to receiving a subsequent audible command that comprises the suggested modification, an embodiment may perform the originally intended user-function. In an embodiment, responsive to not receiving any user feedback input after a function is executed, an embodiment may gain confidence that the executed function corresponds to the user-intended function. An embodiment may thereafter store that correlation in an accessible database (e.g., stored locally, stored remotely, etc.) and perform the stored function responsive to subsequently receiving the same audible command in the future.

In an embodiment, after a user has provided a predetermined number of consecutive audible commands without thereafter providing user-feedback input, an embodiment may disable the suggested modification output. The dynamic disablement of the suggested modification outputs may indicate that a user is gaining fluency with a device. In an embodiment, all suggested modification outputs may be disabled for the device or, alternatively, only some of the suggested modification outputs may be disabled, for example, that corresponds to a specific command type. For example, all suggested modification outputs corresponding to volume adjustment may be disabled but suggested modification outputs corresponding to home automation functions may still be enabled. Additionally or alternatively, suggested modification outputs may be manually turned off and on by a user.

The various embodiments described herein thus represent a technical improvement to conventional user input correction techniques. Using the techniques described herein, an embodiment may receive an audible command from a user and determine one aspect associated with the command that prevents performance of a user-intended function. An embodiment may thereafter provide a suggested modification to the user that they may incorporate into a subsequently provided audible command. Such techniques may educate a user how to better interact and provide input to a particular device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an audible command to perform a function;
   performing, based on the audible command, the function;
   receiving, after performance of the function, user feedback input that the function does not correspond to a user-intended function;
   determining, using a processor, at least one aspect associated with the audible command that prevents performance of the user-intended function;
   providing, based on the determining, a suggested modification to the audible command to facilitate performance of the user-intended function;
   identifying receipt of a predetermined number of subsequent audible commands to perform the function that contain the suggested modification, wherein the predetermined number of subsequent audible commands are not accompanied by additional user feedback input; and
   disabling, without receiving additional user input and based upon the identifying, provision of suggested modifications for user commands associated with a type of the audible command, wherein the type of the audible command corresponds to a class of functions performed by the information handling device.

2. The method of claim 1, wherein the function is associated with a user-intended function.

3. The method of claim 1, wherein the at least one aspect is associated with a volume level of the audible command.

4. The method of claim 1, wherein the at least one aspect is associated with a format of the audible command.

5. The method of claim 1, wherein the at least one aspect is associated with an ambiguity in the audible command.

6. The method of claim 1, wherein the determining comprises:
   performing, based on the audible command, another function different than the function; and
   thereafter receiving user input indicating that the another function is not the function.

7. The method of claim 1, wherein the providing comprises providing the suggested modification using at least one of visual output and audible output.

8. The method of claim 1, wherein the suggested modification comprises a description of the at least one aspect.

9. The method of claim 1, further comprising receiving another audible command comprising the suggested modification and thereafter performing the function.

10. An information handling device, comprising:
    a processor;
    a memory device that stores instructions executable by the processor to:
    receive an audible command to perform a function;
    perform, based on the audible command, the function;
    receive, after performance of the function, user feedback input that the function does not correspond to a user-intended function;
    determine at least one aspect associated with the audible command that prevents performance of the user-intended function; provide, based on the determining, a suggested modification to the audible command to facilitate performance of the user-intended function;
    identify receipt of a predetermined number of subsequent audible commands to perform the function that contain the suggested modification, wherein the predetermined number of subsequent audible commands are not accompanied by additional user feedback input; and
    disable, without receiving additional user input and based upon the identifying, provision of suggested modifications for user commands associated with a type of the audible command, wherein the type of the audible command corresponds to a class of functions performed by the information handling device.

11. The information handling device of claim 10, wherein the function is associated with a user-intended function.

12. The information handling device of claim 10, wherein the at least one aspect is associated with a volume level of the audible command.

13. The information handling device of claim 10, wherein the at least one aspect is associated with a format of the audible command.

14. The information handling device of claim 10, wherein the at least one aspect is associated with an ambiguity in the audible command.

15. The information handling device of claim 10, wherein the instructions executable by the processor to determine comprise instructions executable by the processor to:
    perform, based on the audible command, another function different than the function; and
    thereafter receive user input indicating that the another function is not the function.

16. The information handling device of claim 10, wherein the suggested modification comprises a description of the at least one aspect.

17. The information handling device of claim 10, wherein the instructions are further executable by the processor to receive another audible command comprising the suggested modification and thereafter perform the function.

18. A product, comprising:
    a storage device that stores code, the code being executable by a processor and comprising:
    code that receives an audible command to perform a function;
    code that performs, based on the audible command, the function;
    code that receives, after performance of the function, user feedback input that the function does not correspond to a user-intended function;
    code that determines at least one aspect associated with the audible command that prevents performance of the user-intended function;
    code that provides, based on the determining, a suggested modification to the audible command to facilitate performance of the user-intended function;
    code that identifies receipt of a predetermined number of subsequent audible commands to perform the function that contain the suggested modification, wherein the predetermined number of subsequent audible commands are not accompanied by additional user feedback input; and code that disables, without receiving additional user input and based upon the identifying, provision of suggested modifications for user commands associated with a type of the audible command, wherein the type of the audible command corresponds to a class of functions performed by the information handling device.

\* \* \* \* \*